United States Patent
Xu et al.

(10) Patent No.: US 10,812,462 B2
(45) Date of Patent: Oct. 20, 2020

(54) SESSION MANAGEMENT FOR MOBILE DEVICES

(71) Applicant: ServiceNow, Inc., Santa Clara, CA (US)

(72) Inventors: Kai Xu, San Jose, CA (US); Liufang Xu, San Jose, CA (US); Subbaraya Kumar Deverakonda Venkata, Milpitas, CA (US); Oleg Yakov Sherman, Gedera (IL)

(73) Assignee: ServiceNow, Inc., Santa Clara, CA (US)

( * ) Notice: Subject to any disclaimer, the term of this patent is extended or adjusted under 35 U.S.C. 154(b) by 101 days.

(21) Appl. No.: 16/242,622

(22) Filed: Jan. 8, 2019

(65) Prior Publication Data

US 2020/0220853 A1      Jul. 9, 2020

(51) Int. Cl.
| | |
|---|---|
| *H04L 29/06* | (2006.01) |
| *H04L 29/08* | (2006.01) |
| *H04L 9/32* | (2006.01) |
| *G06F 16/955* | (2019.01) |

(52) U.S. Cl.
CPC .......... *H04L 63/08* (2013.01); *G06F 16/955* (2019.01); *H04L 9/3213* (2013.01); *H04L 9/3236* (2013.01); *H04L 67/02* (2013.01); *H04L 67/143* (2013.01)

(58) Field of Classification Search
CPC ....... H04L 63/08; H04L 67/143; H04L 67/02; H04L 9/3213; H04L 9/3236; G06F 16/955
See application file for complete search history.

(56) References Cited

U.S. PATENT DOCUMENTS

| | | | | |
|---|---|---|---|---|
| 8,001,586 | B2 * | 8/2011 | Zhang | G06Q 20/206 358/1.15 |
| 8,607,306 | B1 * | 12/2013 | Bridge | H04L 63/068 726/1 |
| 9,106,642 | B1 * | 8/2015 | Bhimanaik | G06F 21/335 |

(Continued)

OTHER PUBLICATIONS

Karaki, Jad, "Identity Management: SAML vs. OAuth2 vs. OpenId Connect." (Year: 2019).*

(Continued)

*Primary Examiner* — Alina A Boutah
(74) *Attorney, Agent, or Firm* — Fletcher Yoder, P.C.

(57) ABSTRACT

A computing system includes a web browser and a native application configured to, at a first time, receive first instructions to log out of a first session authorized by way of an authorization server. Based on the first instructions, the native application removes a first access token that was provided to the native application by the authorization server and is related to authorization of the first session. At a second time later than the first time, the native application receives second instructions to authorize a second session and, based thereon, generates third instructions configured to cause the authorization server to terminate active sessions between the authorization server and the web browser prior to initiating a log-in procedure with the web browser for the second session. The third instructions are provided to the authorization server, which provides an authorization code exchangeable for a second access token related to the second session.

20 Claims, 11 Drawing Sheets

(56) References Cited

U.S. PATENT DOCUMENTS

| | | | | |
|---|---|---|---|---|
| 9,369,286 B2* | 6/2016 | Shukla | ................ | H04W 12/06 |
| 10,057,246 B1* | 8/2018 | Drozd | ................ | G06F 21/604 |
| 10,462,124 B2* | 10/2019 | Kong | ................ | H04L 63/083 |
| 10,469,484 B1* | 11/2019 | Chen | ................ | H04L 63/0807 |
| 10,541,992 B2* | 1/2020 | Kong | ................ | H04L 63/083 |
| 2010/0017891 A1* | 1/2010 | Thierbach | ............. | G06F 16/957 |
| | | | | 726/29 |
| 2010/0306668 A1* | 12/2010 | Williams, III | ........ | H04L 9/3226 |
| | | | | 715/741 |
| 2013/0318593 A1* | 11/2013 | Smith | ................ | G06F 16/907 |
| | | | | 726/9 |
| 2014/0082715 A1* | 3/2014 | Grajek | ................ | G06F 16/955 |
| | | | | 726/8 |
| 2015/0113588 A1* | 4/2015 | Wing | ................ | H04L 63/0227 |
| | | | | 726/1 |
| 2015/0149766 A1* | 5/2015 | Shukla | ................ | H04L 9/3247 |
| | | | | 713/155 |
| 2015/0312038 A1* | 10/2015 | Palanisamy | ............. | G06F 21/33 |
| | | | | 713/155 |
| 2016/0077853 A1* | 3/2016 | Feng | ................ | G06F 9/54 |
| | | | | 719/328 |
| 2017/0310759 A1* | 10/2017 | Sridharan | ................ | H04L 67/14 |
| 2019/0222582 A1* | 7/2019 | Laursen | ................ | H04L 67/146 |
| 2020/0008020 A1* | 1/2020 | James | ................ | H04L 63/0884 |
| 2020/0104473 A1* | 4/2020 | Yu | ................ | H04L 63/102 |
| 2020/0127832 A1* | 4/2020 | Ebrahimi | ............. | H04L 9/0866 |
| 2020/0145425 A1* | 5/2020 | Chauhan | ................ | H04L 67/146 |

OTHER PUBLICATIONS

William Denniss et al., OAuth 2.0 for Native Apps, Internet Engineering Task Force (IETF), Published Oct. 2017.

Nat Sakimura et al., Proof Key for Code Exchange by OAuth Public Clients, Internet Engineering Task Force (IETF), Published Sep. 2015.

* cited by examiner

SESSION MANAGEMENT FOR MOBILE DEVICES

BACKGROUND

OAuth is a standard for token-based authorization of software applications. OAuth allows an end user to selectively provide the software applications with access to some of the resources stored by a resource server on behalf of the end user without sharing the end user's username or password. In order to access this information, the software application may obtain an access token from an authentication server associated with the resource server. The authorization server may be configured to provide the access token based on the end user successfully authenticating with the authorization server and granting permission to a particular software application to access the information.

SUMMARY

By implementing the OAuth standard, a native software application may be configured to obtain an access token from an authorization server, which it may use to access corresponding resources provided by a resource server. In obtaining the access token, the native software application may utilize a web browser application provided by a computing device on which the native software application is installed and configured to execute. Namely, the native software application may, by way of the web browser, transmit to the authorization server a request for an authorization code. The web browser may then be used to provide login credentials to the authorization server, receive therefrom an authorization code, and pass this authorization code back to the native software application. The native software application may then provide this authorization code, along with further information identifying the native software application, to the authorization server in exchange for the access token.

This login process may establish a communicative session, which may be made up of at least two sub-sessions. First, the access token obtained by the native software application may represent an application-server session between the native software application and the authorization and/or resource servers. Namely, while the token remains valid (e.g., for a predetermined period of time), the application-server session may persist. Thus, during this time the native software application may be able to obtain, from the resource server, various resources authorized by the access token. Second, in response to the web browser application providing valid login credentials, the authorization server may establish therewith a browser-server session. The browser-server sessions may be represented by, for example, a session cookie (e.g., a hypertext transfer protocol (HTTP) cookie) stored by the web browser application.

When the native software application receives instructions to log out, the native software application may terminate the application-server session by deleting the access token. However, the native software application might not have the necessary privileges to delete or otherwise invalidate the session cookie stored by the web browser application. As a result, the browser-server session may persist for at least a predetermined period of time after the native software application logs out. For example, the browser-server session may persist until the session cookie expires or is deleted from the web browser application. Notably, the predetermined period of time for which the browser-server session (e.g., the HTTP cookie) persists (e.g., a first predetermined period of time) may be different from the predetermined period of time for which the application-server session (e.g., the access token) persists (e.g., a second predetermined period of time).

Thus, when the native software application is again requested to log in and does so by utilizing the web browser application, the web browser application might not need to provide the login credentials to the authorization server. That is, the authorization server may rely on the session cookie to determine that a valid session is still active between the authorization server and the web browser, and re-authentication is thus not needed.

Such logout and login behavior may be undesirable for at least two reasons. First, such behavior may be contrary to user expectations and habits. Namely, after a user logs out of the native software application, the user may expect to provide login credentials in order to log back in. Even if such behavior is not inconvenient, it may appear to the user as incorrect, inconsistent, or insecure, thereby reducing the user's usage of the native software application. Second, such behavior may be a potential security flaw. Namely, when a mobile device is shared among multiple users, a first user's logout from the native software application might not be effective in preventing other users from accessing the first user's accounts, information, and other data associated with the native software application. That is, when a second user attempts to log in to the native software application before the first user's session cookie expires, the second user may be automatically logged in to the first user's account.

Accordingly, once the native software application has been logged out, it may be configured to cause the authorization server to log the web browser application out before initiating a subsequent login procedure. That is, the native software application may generate and transmit, by way of the web browser application and to the authorization server, instructions configured to cause the authorization server to terminate any active browser-server sessions before starting another login procedure.

These instructions may be generated and transmitted based on or in response to the native software application being requested to login and establish another session. Thus, the instructions may accompany additional instructions that cause the authorization server to initiate another login procedure. Accordingly, the authorization server may first terminate any sessions with the web browser application and subsequently initiate the login procedure for the new session. As a result, the web browser may be asked to provide login credentials for this new session, rather than being allowed to rely on any existing sessions with the authorization server.

Alternatively, in some implementations, the instructions to terminate any browser-server sessions may be transmitted to the authorization server before and independently of the additional instructions that cause the authorization server to initiate another login procedure. For example, the instructions to terminate the browser-server sessions may be transmitted in response to the native application being requested to log out. That is, the browser-server sessions may be terminated contemporaneously with the native software application's deletion or removal of the access token.

In some implementations, the authorization server, the resource server, or another server device may be configured to provide both guest sessions and logged-in sessions to client devices. Guest sessions may be initiated with client devices without these client devices having to provide login credentials. Logged-in sessions, on the other hand, may be initiated in response to the client devices providing to the server device valid login credentials. In order to more efficiently manage the extent of resources used by the server devices in maintaining these sessions, the guest sessions may have a shorter timeout than the logged-in sessions. For example, the server may delete guest sessions after 5 minutes of inactivity, and may delete logged-in session after 30 minutes of inactivity. Such a scheme may allow the server devices to guard against or at least lessen the impact of, for example, denial of service attacks by limiting the amount of resources that are used to support guest sessions that are idle.

Additionally, in some cases, the duration, or timeout, of the guest sessions and the logged-in sessions may be dynamically scaled based on the amount of resources used at a given point in time. For example, as more resources are used, the timeout of the sessions may be shortened. Such shortening may be applied proactively to new sessions and/or retroactively to old sessions. Similarly, such timeout shortening may be applied to guest sessions and/or the logged-in sessions, depending on the amount of available resources. In some cases, the timeout of the guest and logged-in sessions may be determined or scaled based on other attributes such as a priority level associated with a particular service, a priority associated with an IP address of the client device, and/or a priority associated with the username associated with the logged-in session.

Accordingly, in a first example embodiment, a method may involve, at a first time, receiving, by a native software application, first instructions to log out of a first session. The first session was authorized by way of an authorization server in response to a web browser application providing valid log-in credentials to the authorization server on behalf of the native software application. The method may also involve, based on the first instructions, removing, by the native software application, a first access token that: (i) was provided to the native software application by the authorization server and (ii) is related to authorization of the first session. The method may additionally involve, at a second time later than the first time, receiving, by the native software application, second instructions to authorize a second session by way of the authorization server. The method may further involve, based on receiving the second instructions, generating, by the native software application, third instructions configured to cause the authorization server to terminate active sessions between the authorization server and the web browser application prior to initiating a log-in procedure with the web browser application for the second session. The method may yet further involve providing, by the native software application, the third instructions to the authorization server by way of the web browser application and receiving, by the native software application, an authorization code from the authorization server. The authorization code is exchangeable for a second access token related to the second session.

In a second example embodiment, a computing system may include a web browser application and a native software application configured to, at a first time, receive first instructions to log out of a first session. The first session was authorized by way of an authorization server in response to the web browser application providing valid log-in credentials to the authorization server on behalf of the native software application. The native software application may also be configured to, based on the first instructions, remove a first access token that: (i) was provided to the native software application by the authorization server and (ii) is related to authorization of the first session. The native software application may additionally be configured to, at a second time later than the first time, receive second instructions to authorize a second session by way of the authorization server. The native software application may further be configured to, based on receiving the second instructions, generate third instructions configured to cause the authorization server to terminate active sessions between the authorization server and the web browser application prior to initiating a log-in procedure with the web browser application for the second session. The native software application may yet further be configured to provide the third instructions to the authorization server by way of the web browser application and receive, from the authorization server, an authorization code. The authorization code is exchangeable for a second access token related to the second session.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
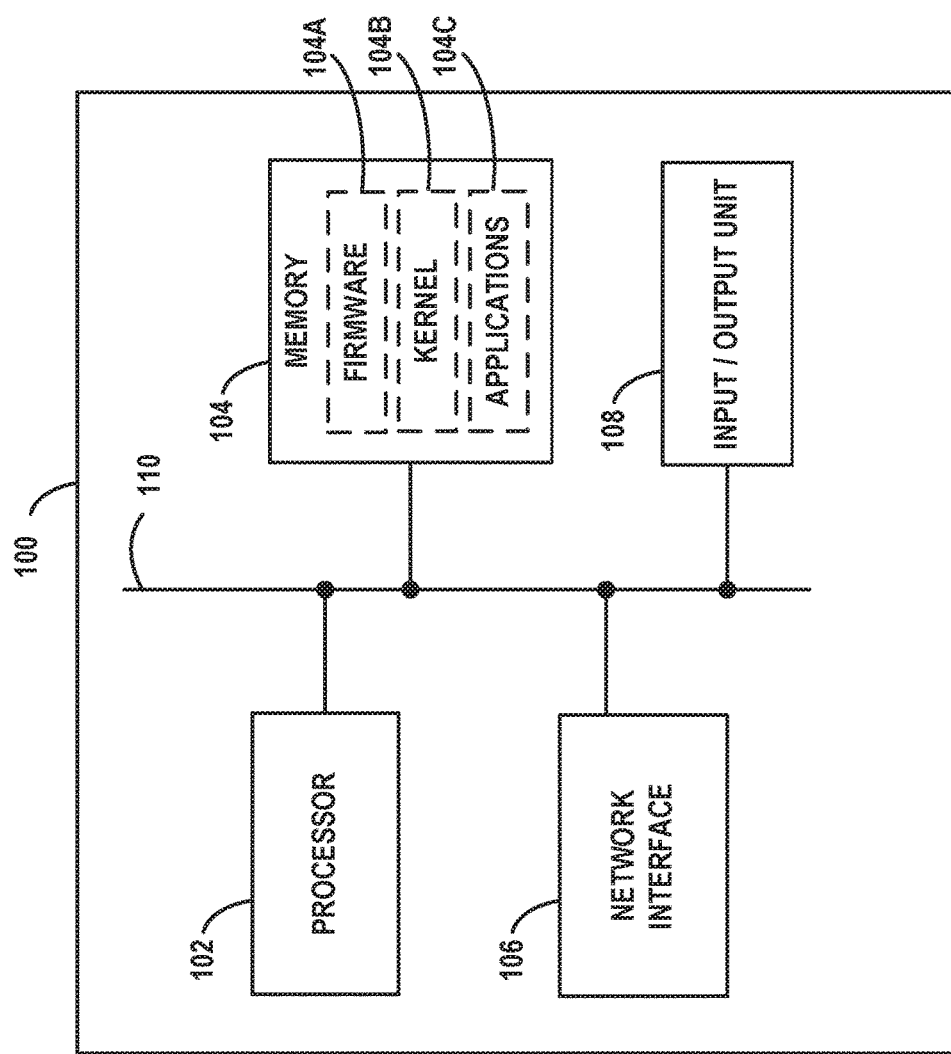
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
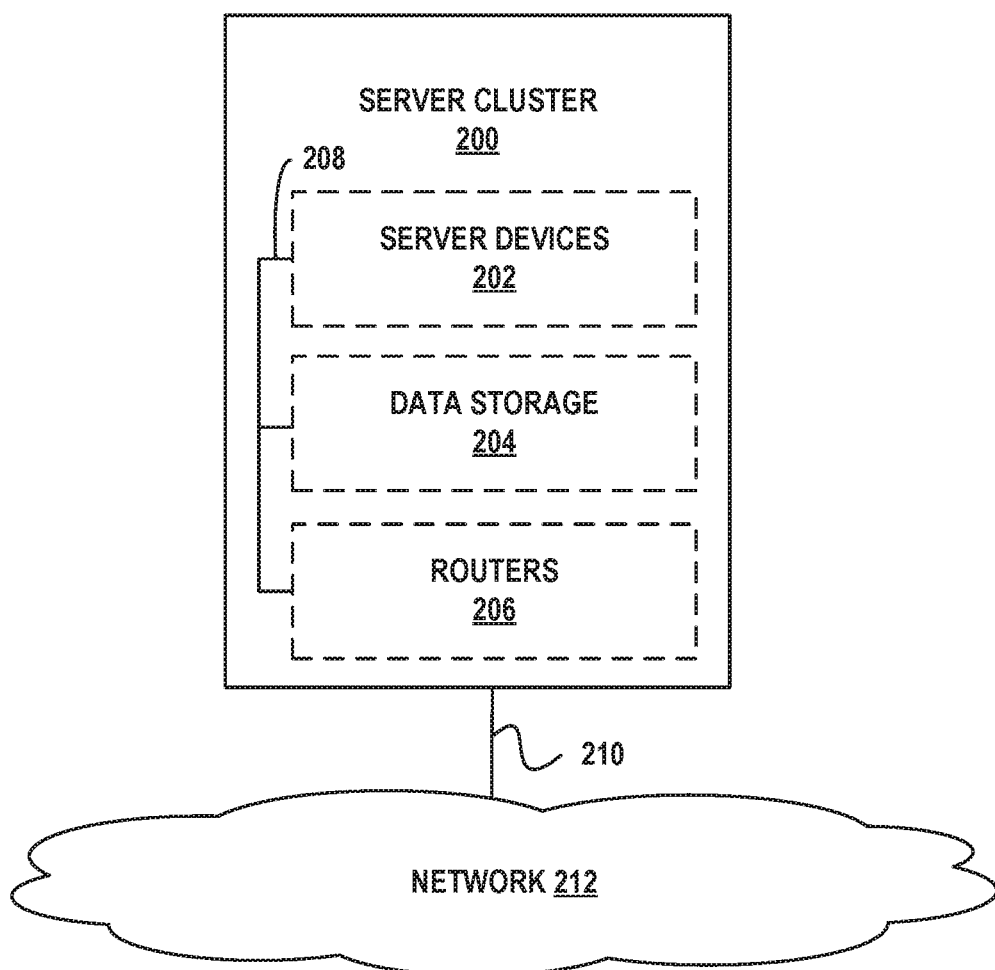
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
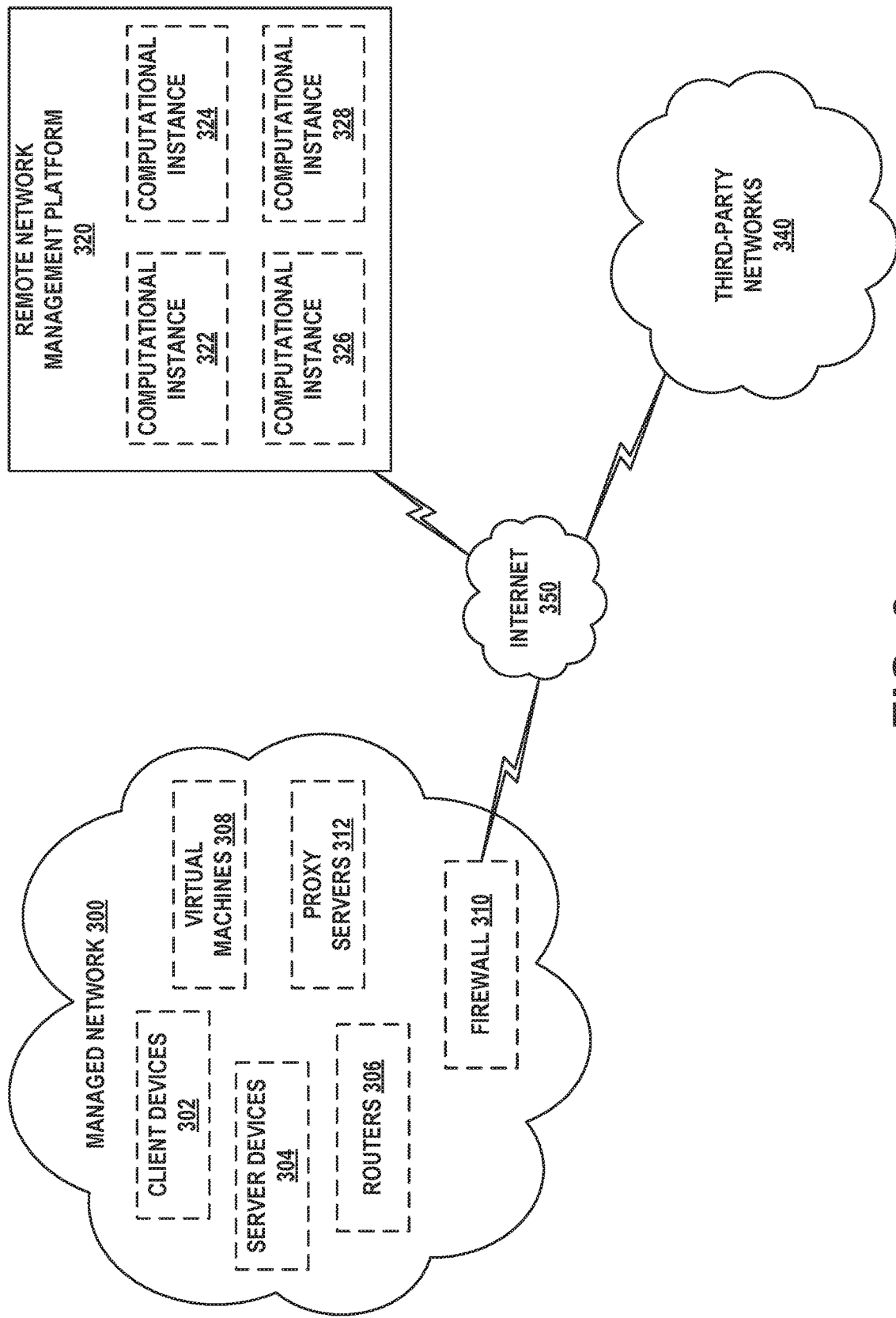
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
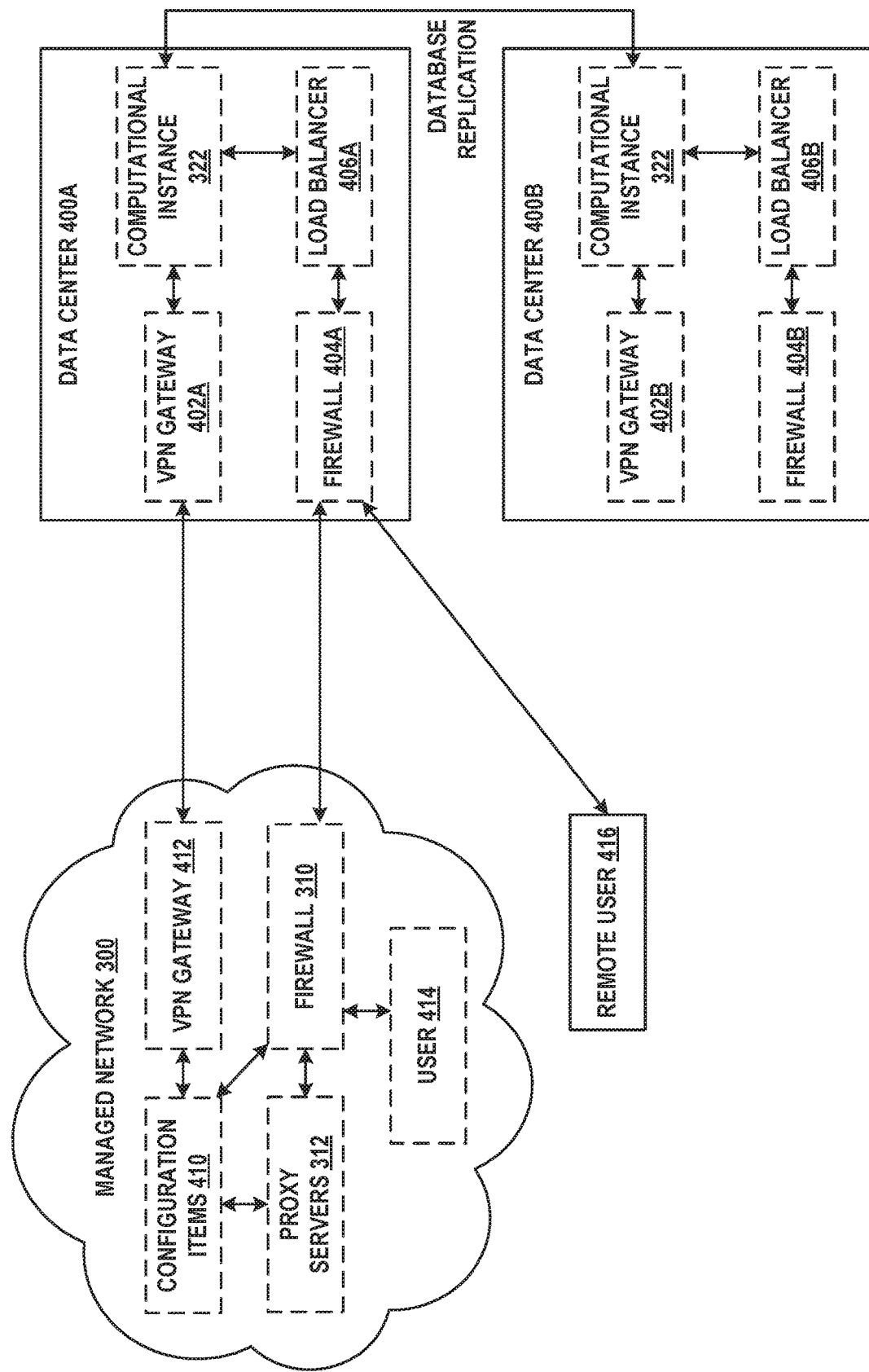
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
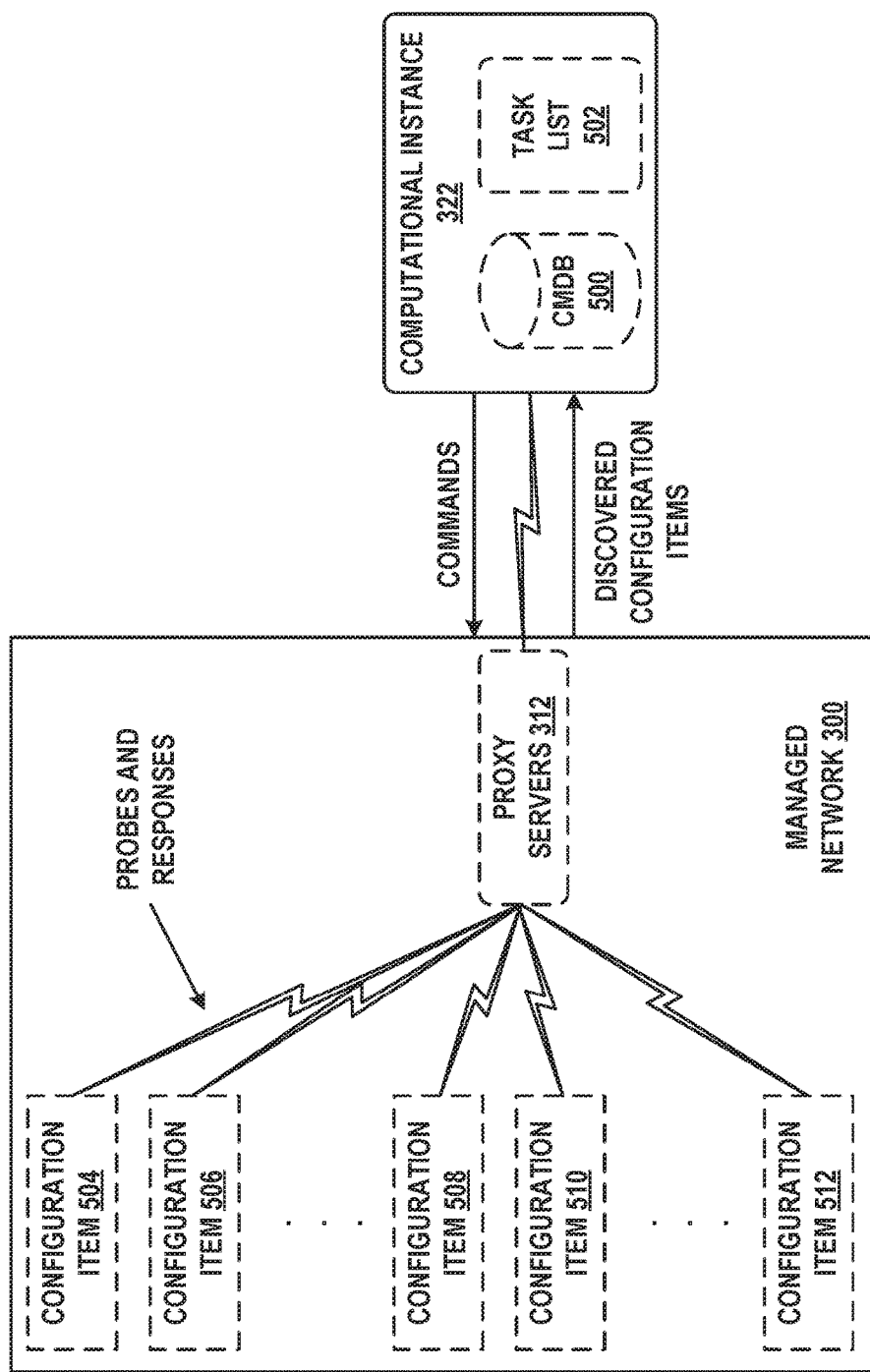
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
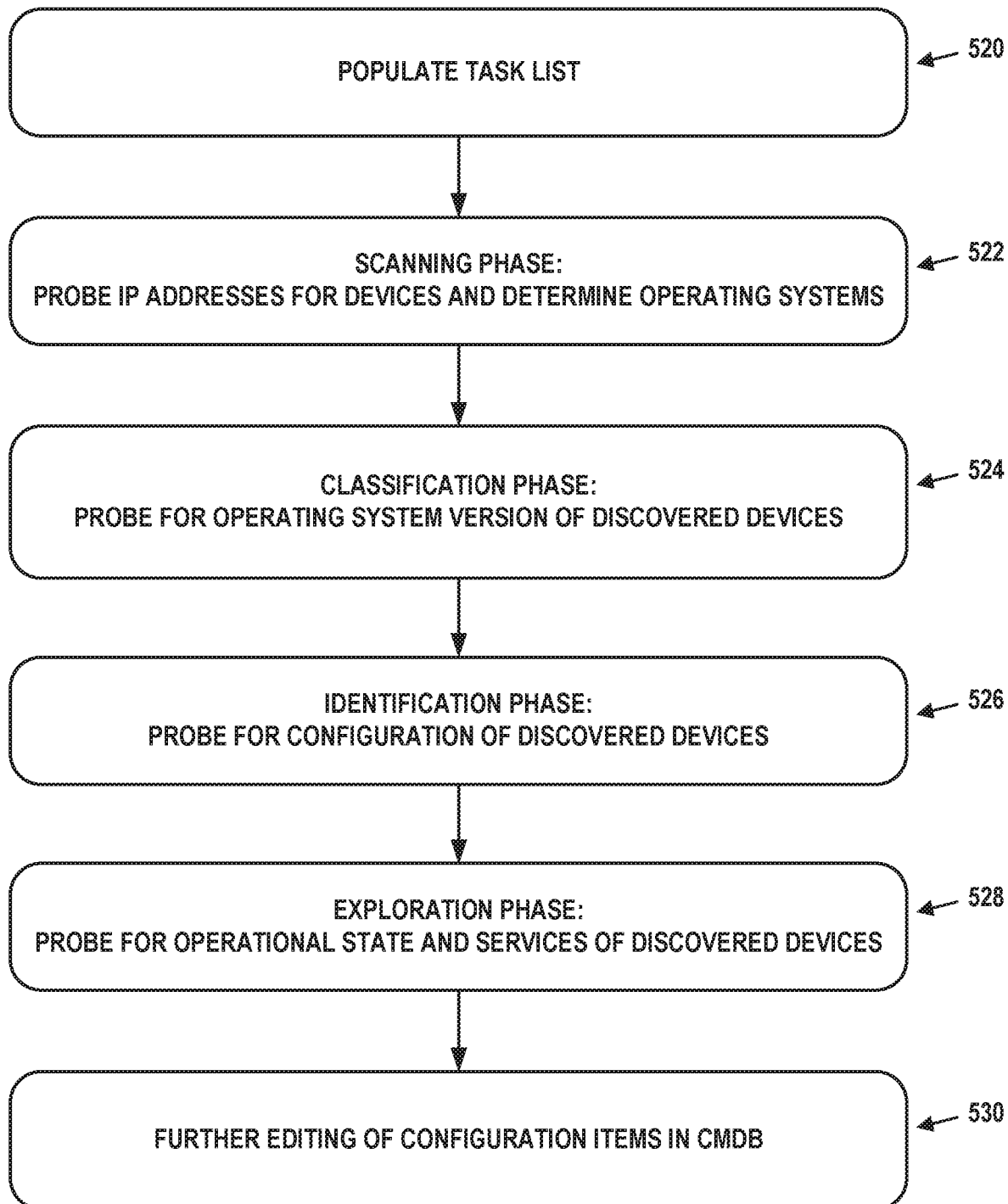
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Native Application Login and Logout Operations

A native software application executing on a computing device may utilize a web browser application executing on the same computing device during a login procedure (e.g., OAuth). Namely, the web browser application may connect to an authentication server and provide login credentials on behalf of the native software application. As a result, the authentication server may initiate a communicative session made up of (i) one session with the web browser (represented by a session cookie provided to the web browser application) and (ii) another session with the native software application (represented by an access token provided to the native software application).

Upon logging out from the native software application, the native application may remove (e.g., invalidate, delete, destroy, or otherwise forget) the access token. However, the native software application might not have permission to remove the session cookie. As a result, the session between the authorization server and the web browser may remain active for at least a predetermined period of time dictated, for example, by authorization server settings. Upon a subsequent login attempt of the native software application prior to this predetermined period of time, the web browser application may be able to authorize login of the native software application without having to provide login credentials. Such behavior may be contrary to what is expected of the native software application and may also be a security flaw, allowing one user to gain access using another user's credentials.

Figure 6A:
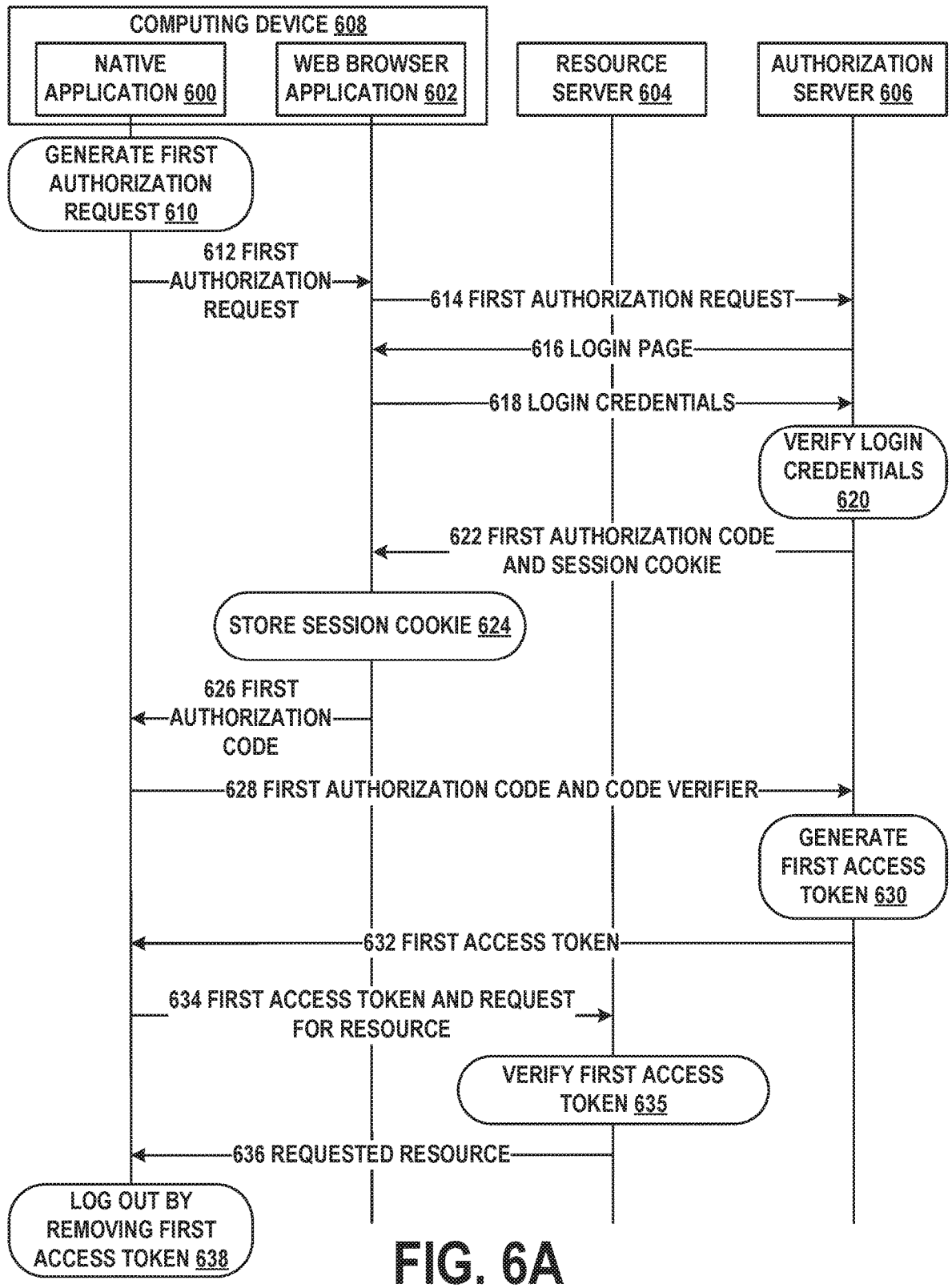
FIG. 6A depicts a message flow diagram, in accordance with example embodiments.
Figure 6B:
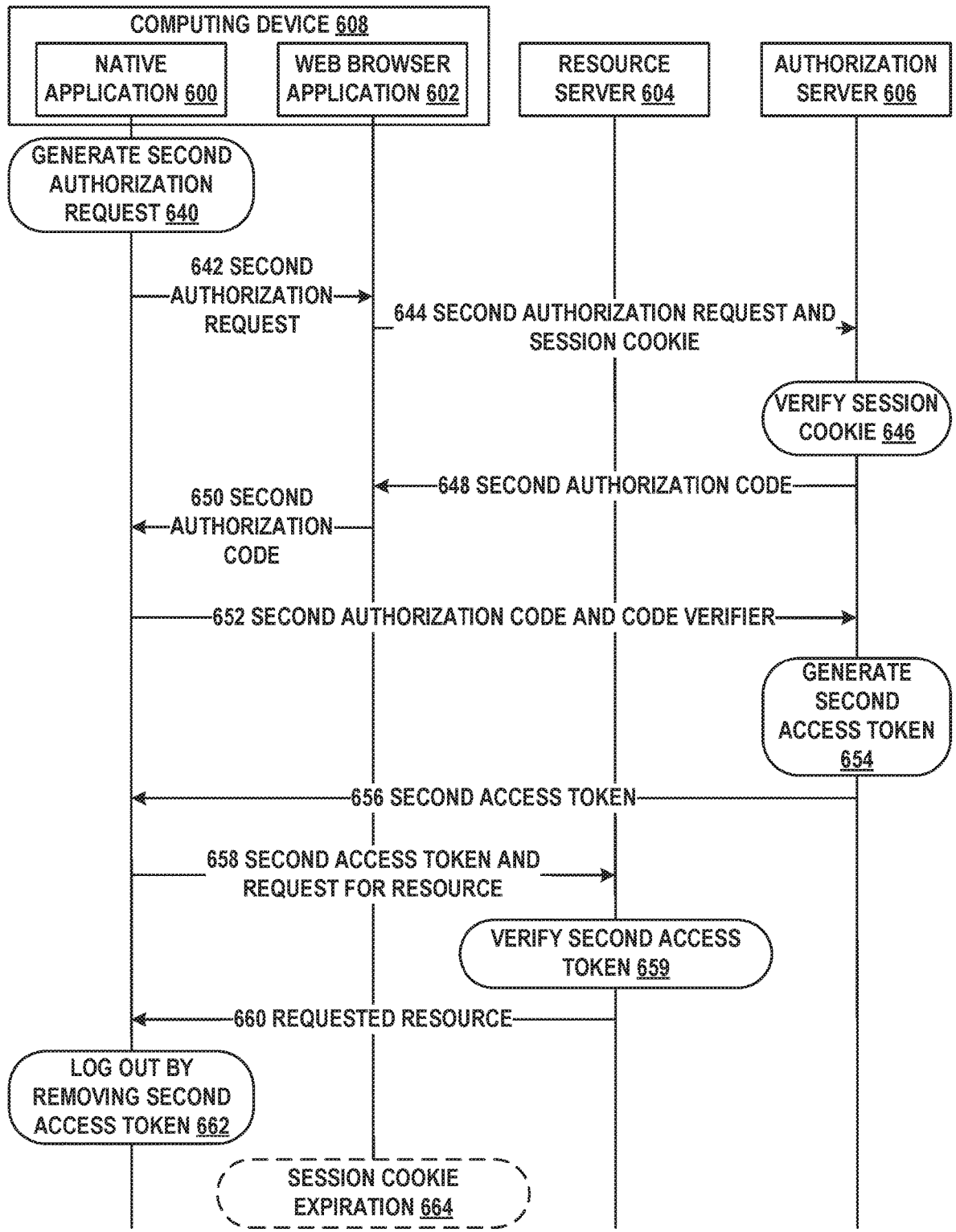
FIG. 6B depicts a message flow diagram, in accordance with example embodiments.

FIGS. 6A and 6B illustrate an example login and logout process for a native software application. Native software application 600 ("native application," for short) and web browser application 602 ("web browser," for short) may each be disposed and configured to be executed by computing device 608. Native application 600 may be a software application developed for use on a particular computing platform (e.g., operating system) or computing device, and can take advantage of operating system features, hardware features (e.g., hardware accelerators), or other software features provided by the particular computing platform or device. In the context of a mobile device, for example, a native application may be downloadable from an application store (e.g., APPLE® App Store or GOOGLE® Play Store) provided by or associated with an entity that provides the operating system of the mobile device. Web browser 602 may be any application configured for accessing information on the world-wide web including, for example, (GOOGLE® CHROME®, MOZILLA® FIREFOX®, APPLE® SAFARI®, or MICROSOFT® INTERNET EXPLORER®).

Native application 600 may be configured to access one or more resources provided by resource server 604. In order to access these resources, native application 600 may be configured to first obtain an access token from authorization server 606. In some cases, resource server 604 and authorization server 606 may be operated by a same entity. Alternatively, however, authorization server 606 may be provided by a first entity that manages login credentials while resource server 604 may be provided by a second entity that relies on the first entity for authorization before providing access to the resources of resource server 604. In one example, resource server 604 and/or authorization server 606 may be provided by remote network management platform 320. Resource server 604, for example, may represent computational instance 322. Alternatively, resource server 604 and/or authorization server 606 may be provided by managed network 300.

Native application 600 may be configured to generate a first authorization request, as indicated by block 610. The first authorization request may include at least (i) a request for a first authorization code and (ii) a callback uniform resource locator (URL) identifying native software application 600 as the recipient of the first authorization code. That is, the callback URL may indicate to authorization server 606 and web browser 602 where to provide the first authorization code after it is generated.

In one example, the first authorization request may be generated by native application 600 in response to receiving a request to access one or more resources provided on resource server 604. In another example, the first authorization request may be generated by native application 600 in response to receiving a request to login to (i.e., authorize a session with) a platform or service with which resource server 604 is associated. Such requests may be received by native application 600 by way of a user interface provided thereby and in response to one or more user inputs provided to the user interface.

Based on or in response to generating the first authorization request at block 610, native application 600 may be configured to transmit the first authorization request to web browser 602, as indicated by arrow 612. Native application 600 and web browser 602 may be configured to communicate using inter-application communication or another messaging system provided by the operating system of computing device 608. In one example, transmission of the first authorization request by native application 600 may be configured to cause a software process associated with web browser 602 to be launched. This software process may be used to forward the first authorization request to a URL associated with authorization server 606. The URL may be identified by the transmission at arrow 612. Alternatively, transmission of the first authorization request by native application 600 may be configured to cause an existing (i.e., already-executing) software process to forward the authorization request.

Based on or in response to receiving the first authorization request at arrow 612, web browser 602 may be configured to transmit the first authorization request to authorization server 606 on behalf of native application 600, as indicated by arrow 614. Additionally, reception of the first authorization request at arrow 612 by web browser 602 may cause web browser application 602 to be brought to a foreground of computing device 608 such that a user interface of web browser application 602 is visible (e.g., this user interface may appear to pop up over that of native application 600). In some implementations, the user interface may be embedded in, provided by, or otherwise shown in the context of native application 600 (e.g., as a web view), although at least a portion of the operations involved in displaying this user interface may be carried out by web browser 602.

Based on or in response to receiving the request at arrow 614, authorization server 606 may be configured to transmit, to web browser 602, a response that comprises a login page, as indicated by arrow 616. Reception of the login page at arrow 616 may cause web browser 602 to display the login page in the user interface displayed when web browser 602 is brought into the foreground. The login page may define one or more text input regions configured to receive login credentials (e.g., username and password) associated with authorization server 606. Accordingly, based on or in response to receiving the login page at arrow 616 (and receiving input of the login credentials), web browser 602 may be configured to provide the login credentials to authorization server 606, as indicated by arrow 618.

Based on or in response to receiving the login credentials at arrow 618, authorization server 606 may be configured to verify the login credentials to determine whether web browser 602 and/or native application 600 should be allowed to log in or proceed further in the login process, as indicated by block 620. Verifying the login credentials may involve, for example, comparing a hash of a password provided by way of web browser 602 to a stored hash of a password associated with the username provided by way of web browser 602. Based on or in response to validating the login credentials at block 620, authorization server 606 may be configured to generate and transmit, to web browser 602, (i) a first authorization code and (ii) a session cookie.

The authorization code may comprise a random or semi-random alphanumeric string that, when passed back to authorization server 606 by native application 600, allows (possibly in combination with other data such as, e.g., a code verifier) native application 600 to obtain an access token. The session cookie may be an HTTP cookie that includes an identifier which authorization server 606 associates with web browser 602. The cookie allows authorization server 606 to remember information about web browser 602. In this case, the session cookie allows authorization server 606 to remember that web browser 602 provided valid login credentials and is thus logged in for a predetermined period of time (e.g., 30 minutes).

Based on or in response to receiving the session cookie at arrow 622, web browser 602 may be configured to store the session cookie for later presentation to authorization server 606, as indicated by block 624. Similarly, based on or in response to receiving the authorization code at arrow 622, web browser 602 may be configured to forward the authorization code to native application 600, as indicated by arrow 626. In some implementations, the authorization code may alternatively be provided from authorization server 606 directly to native application 600 without passing through web browser 602.

Based on or in response to receiving the first authorization code at arrow 626, native application 600 may be configured to transmit, to authorization server 606, the first authorization code along with a code verifier, as indicated by arrow 628. Based on or in response to receiving a valid first authorization code and a valid code verifier at arrow 628, authorization server 606 may be configured to generate a first access token, as indicated by block 630.

In one example, the code verifier may be an alphanumeric string that represents a client secret associated with native application 600. This client secret may be stored by native application 600 and registered with authorization server 606, but might not be known to other applications or devices. Authorization server 606 may need at least the authorization code and the code verifier in order to generate an access token. Thus, even if the first authorization code is intercepted by a malicious software application at any point after its generation by authorization server 606, the authorization code alone might not allow this malicious application to obtain the corresponding access token. However, storage of the client secret by native application 600 might not be secure. For example, a malicious application installed on computing device 608 may be able to gain access the client secret and thus be able to obtain the access token if it also managed to intercept the first authorization code.

Accordingly, in another implementation, native application 600 may utilize the Proof Key for Code Exchange standard instead of storing the client secret on computing device 608. Namely, at block 610, native application 600 may additionally generate a code verifier and a code challenge. The code verifier may be a random alphanumeric string having a predetermined length, a predetermined minimum length, or another predetermined attribute. The code challenge may comprise a hash value of the code verifier. Notably, a new code verifier may be generated for each new authorization request.

A hash value ("hash" for short) may be an alphanumeric string of a fixed size determined by mathematically mapping (i.e., by way of a hash function) the code verifier, which may have a variable length, to the alphanumeric string of the fixed size. The hash may be a cryptographic hash computed by way of a one-way cryptographic hash function (e.g., secure hash algorithm 256 (SHA-256)) that maps the code verifier to a fixed-length sequence. A one-way hash function, which may also be referred to as a message digest or a fingerprint function, is designed in a way that makes it difficult to reverse the hashing process. Thus, once an input is hashed, it is very difficult (i.e., nearly impossible in practice) to determine the input (e.g., the code verifier) that produced the hash. Further, a good one-way hash function also makes it difficult to find two different inputs that would produce the same hash value.

The code challenge may be provided by application 600 to authorization server 606 at arrows 612 and 614, and may be stored by authorization server 606. At arrow 628, native application 600 may provide the first authorization code and the code verifier. Authorization server 606 may then use this code verifier to compute another code challenge. When the code challenge provided by native application 600 at arrows 612 and 614 matches that computed by authorization server 606, authorization server 606 may generate and provide the access token at block 630. Notably, authorization server 606 and native application 600 may use the same hash function to compute their respective code challenges. In one example, authorization server 606 and native application 600 may use a predetermined hash function. Alternatively, application 600 may use different hash functions but may provide authorization server 606 (e.g., at arrows 612 and 614) with an indication of which has function was used to compute the code challenge. Thus, interception of the first authorization code by a malicious application will not allow the malicious application to obtain the access token because the malicious application does not know at least the code verifier used by native application 600.

Based on or in response to generating the first access token at block 630, authorization server 606 may be configured to transmit the first access token to native application 600, as indicated by arrow 632. The access token may be, for example, a JSON web token (JWT). In some implementations, authorization server 606 may additionally provide native application 600 with a refresh token configured to allow native application 600 to obtain, from authorization server 606, an updated access token without having to provide the login credentials. Thus, native application 600 may be able to obtain another access token once the first access token, which is valid for a predetermined period of time, expires.

Based on or in response to receiving the first access token at arrow 632, native application 600 may be configured to transmit, to resource server 604, the first access token and a request for one or more resources, as indicated by arrow 634. In response to receiving the first access token at arrow 634, resource server 604 may be configured to verify the first access token, as indicated by block 635. Verifying the first access token may include determining whether the token has expired and determining whether the token has sufficient scope of access, or access privileges, to obtain the requested resources. Based on or in response to successfully verifying the first access token, resource server 604 may be configured to transmit, to native application 600, the requested resource, as indicated by arrow 636.

After obtaining the requested resource, native application 600 may receive a logout request. For example, a user of native application 600 may hit a "logout" button of native application 600, instructing that the user is done using native application 600 and would like native application 600 to revoke further access privileges for resources on resource server 604. Accordingly, native application 600 may be configured to logout by removing the first access token, as indicated by block 638. Additionally, in implementations where authorization server 606 also provides a refresh token, the refresh token (and other similar tokens) may be deleted as well. Thus, in order to access additional resources from resource server 604 by way of native application 600, native application 600 may need to login again.

Notably, however, native application 600 might not have the privileges or permissions needed to delete or cause web browser 602 to delete the session cookie stored at block 624. Thus, if the operation of block 638 are carried out prior to the expiration of the session cookie stored at block 624, the session between web browser 602 and authorization server 606 may nevertheless remain active.

FIG. 6B illustrates native application 600 obtaining a second access token after removing the first access token but before the session cookie expires. Notably, some of the operations shown in FIG. 6B may be analogous to corresponding operations shown in FIG. 6A. Namely, native application 600 may be configured to generate a second authorization request, as indicated by block 640. The second authorization request may be provided to web browser 602, as indicated by arrow 642, which may forward it to authorization server 606, as indicated by arrow 644. Web browser 602 may also be configured to provide, to authorization server 606, the session cookie (originally provided to web browser 602 at arrow 622) along with the second authorization request.

Based on or in response to receiving the session cookie at arrow 644, authorization server 606 may be configured to verify the session cookie, as indicated by block 646. Namely, authorization server 606 may be configured to determine, based on the session cookie, whether web browser application 602 has provided valid login credentials to authorization server 606 within a predetermined period of time before the transmission at arrow 644. In other words, authorization server 606 may determine whether a valid and active session exists between web browser 602 and authorization server 606.

Based on or in response to determining that web browser 602 is still logged in (i.e., an active session exists), authorization server 606 may be configured to transmit, to web browser 602, a second authorization code, as indicated by arrow 648. Notably, due to the session cookie, authorization server 606 might not provide web browser 602 with an opportunity to provide login credentials. This behavior may be contrary to user expectations, and may constitute a security flaw, since native application 600 has been logged out at block 638. In other words, following native application 600 logging out, native application 600 should not be able to obtain another access token without again providing valid login credentials. That is, for example, after a first user logs out, a second different user should not be able to obtain access without providing the second user's own credentials. In the case at hand, however, the second user may be able to access the first user's accounts or data without having to provide any credentials.

Based on or in response to receiving the second authorization code, web browser 602 may be configured to transmit, to native application 600, the second authorization code received from authorization server 606, as indicated by arrow 650. In some implementations, authorization server 606 may provide the second authorization code to native application 600 directly, thus consolidating the operations of arrows 650 and 648. Native application 600 may transmit the second authorization code, along with a code verifier, to authorization server 606, as indicated by arrow 652. Authorization server 606 may in turn generate a second access token, as indicated by block 654, and transmit the second access token to native application 600, as indicated by arrow 656. Native application 600 may use the second access token to obtain additional resources from resource server 604, as indicated by arrow 658, block 659, and arrow 660.

Native application 600 may again be caused to log out by removing the second access token, as indicated by block 662. Notably, the session cookie stored by web browser 602 may expire, as indicated by block 664, after native application 600 is able to log in and obtain the additional resources without having to provide login credentials.

VI. Example Browser Session Logout Upon Native Application Login

Figure 7:
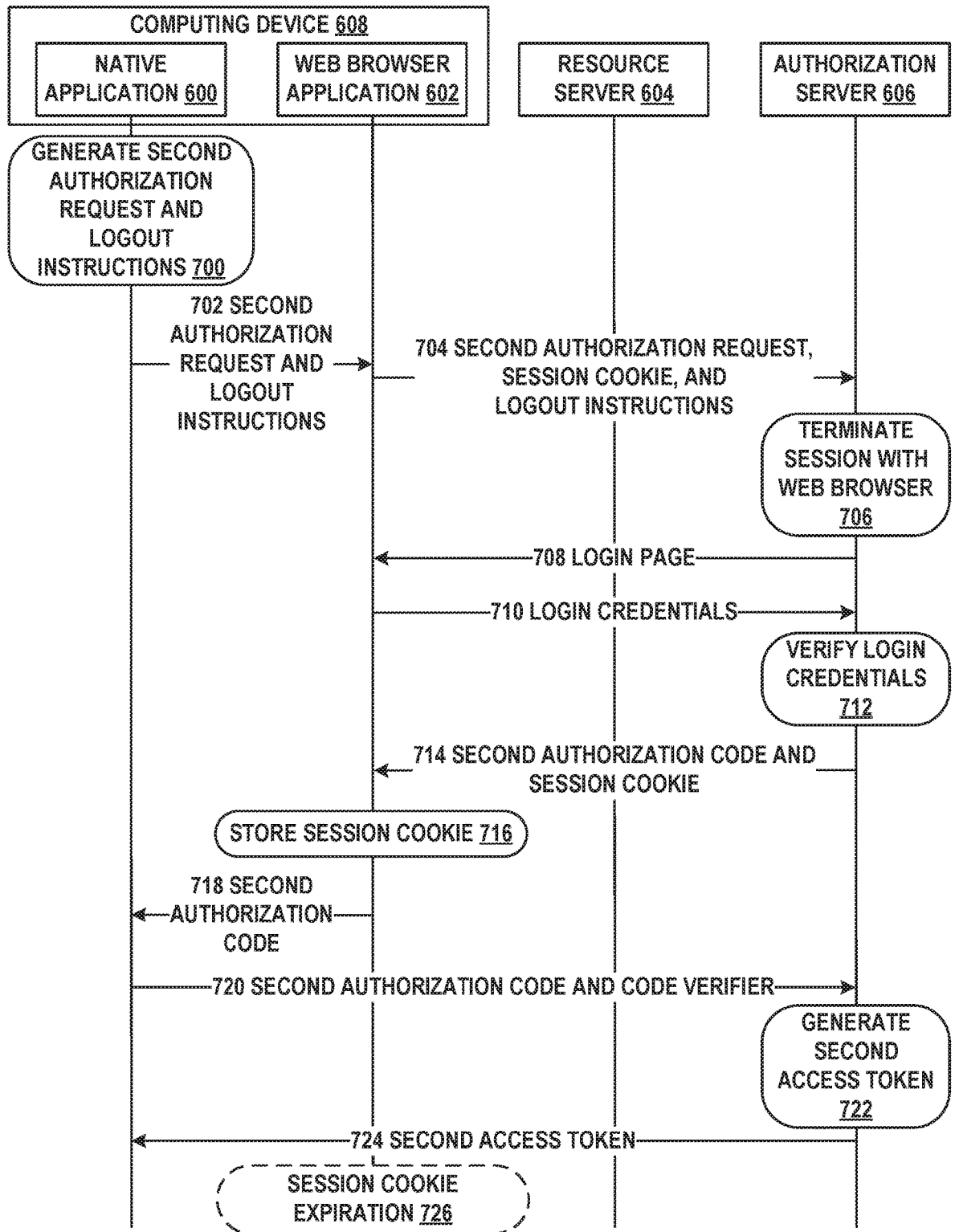
FIG. 7 depicts a message flow diagram, in accordance with example embodiments.

FIG. 7 illustrates an alternative login process that allows a session between web browser 602 and authorization server 606 to be terminated as part of the login of native application 600. Notably, the operations of FIG. 7 are an alternative to those shown in FIG. 6B. After native application 600 has logged out by deleting its access token, native application 600 may again be logged in so that it may access resources provided by resource server 604. To that end, native application 600 may receive instructions to authorize a second session by way of authorization server 606. Based on or in response to these instructions, native application 600 may be configured to generate a second authorization request along with logout instructions for web browser 602, as indicated by block 700. The logout instructions may be configured to cause authorization server 606 to terminate any sessions between authorization server 606 and web browser 602 before initiating another login procedure with web browser 602.

Based on or in response to generating the second authorization request and logout instructions at block 700, native application 600 may be configured to transmit, to web browser 602, the second authorization request and logout instructions, as indicated by arrow 702. Web browser 602 may, in turn, be configured to forward the second authorization request and the logout instructions to authorization server 606, as indicated by arrow 704. Notably, the transmission at arrow 704 may also include therein the session cookie received by web browser 602 from authorization server 606.

In some implementations, the logout instructions may be embedded as a query parameter in a URL used by native application 600 and web browser 602 to access authorization server 606. For example, the URL may be https://authorization.com?logout=true, where "logout=true" indicates to authorization server 606 that native application 600 has been logged out and web browser 602 should therefore be asked to provide login credentials on its behalf in order to log back in. The URL might not include "logout=true," or might instead include "logout=false" when native application 600 has not been logged out. For example, native application 600 might not be logged out but may need to obtain another access token that grants it access to additional resources beyond those authorized by the first access token.

Based on or in response to receiving the logout instructions at arrow 704, authorization server 606 may be configured to terminate the session with web browser 602, as indicated by block 706. Terminating the session between authorization server 606 and web browser 602 may involve the web browser revoking or ignoring the session cookie provided at arrow 704 so as to cause web browser 602 to provide valid login credentials again, notwithstanding the fact that the session cookie might otherwise represent a valid session.

Based on or in response to terminating the session at block 706, authorization server 606 may be configured to transmit, to web browser 602, a login page, as indicated by arrow 708. Thus, since native application 600 has been logged out, web browser 602 may need to provide valid credentials to authorization server 606 on behalf of native application 600 in order to log native application 600 back in again. Thus, based on or in response to receiving input of credentials, web browser 602 may be configured to transmit the credentials to authorization server 606, as indicated by arrow 710. Authorization server may verify the login credentials, as indicate by block 712, and transmit the second authorization code to native application 600 by way of web browser 602, as indicated by arrows 714 and 718. Notably, authorization server 606 may provide web browser 602 with an updated session cookie at arrow 714, which web browser 602 may be configured to store, as indicated by block 716. This session cookie, much like the first one, may remain valid for a predetermined period of time.

Based on or in response to receiving the second authorization code, native application 600 may be configured to exchange the second authorization code and a code verifier for a second access token, as indicated by arrow 720, block 722, and arrow 724. Notably, however, the second access token may be obtained after web browser 602 is used to provide valid login credentials. That is, using the operations of FIG. 7, a session cookie stored by web browser 602 cannot be used to avoid providing login credentials after native application 600 has been logged out.

Also, when native application 600 has not been logged out and the session cookie remains valid, the session cookie may nevertheless be used to avoid having to provide login credentials. For example, when native application 600 is instructed to obtain an updated access token that has a larger scope of access to (e.g., can access a larger number of) resources on resource server 604, authorization server 606 may provide the updated access token on the basis of the session cookie, without requiring access credentials. Authorization server 606 may, however, provide a web page informing a user of the request for additional scope of access and provide the updated access token based on obtaining user permission to provide such an additional scope of access.

Notably, the session cookie obtained at arrow 714 and stored by web browser 602 may expire after a predetermined period of time, as indicated by block 726. Alternatively, this session cookie may be invalidated by another transmission of logout instructions by native application 600 prior to the expiration time of this session cookie.

Additionally, in some implementations, the operations related to terminating any active sessions between web browser 602 and authorization server 606 may alternatively be carried out independently of initiating a further login session. For example, the logout instructions may be generated at block 700 based on or in response to native application 600 logging out by deleting the first access token. The logout instructions (without the second authorization request) may be transmitted to authorization server 606 by way of browser 602, as indicated by arrows 702 and 704, and executed by authorization server 606 at block 706. Thus, complete logout of native application 600 and web browser 602 may be effectuated independently of and before receiving a subsequent login request.

VII. Example Session Timeout Management

Establishing a communicative connection with a server device, whether by native application 600, web browser 602, or another software application, may utilize server resources during a period of time. For example, the server device may dedicate memory to tracking session data associated with each established communication for at least a respective timeout period associated with each connection. This tracked data may correspond to the session cookie or access token, among other possibilities, that allow the server device to track the identity of computing devices and software applications with which the communicative connections are established. This period of time during which a session persists (and server resources are dedicated thereto) may be referred to as a session timeout or an idle session timeout.

In some cases, however, the server device may be faced with a large amount of communicative connections that might take up a large portion of its available resources, resulting in the server device's inability to establish additional communicative connections. For example, a denial of service attack may establish a large number of sessions, but might not exhibit any activity after establishing such sessions. Accordingly, FIG. 8 illustrates various techniques for managing the number and duration of sessions maintained by the server device in order to more efficiently allocate and manage the resources of the server device.

Figure 8:
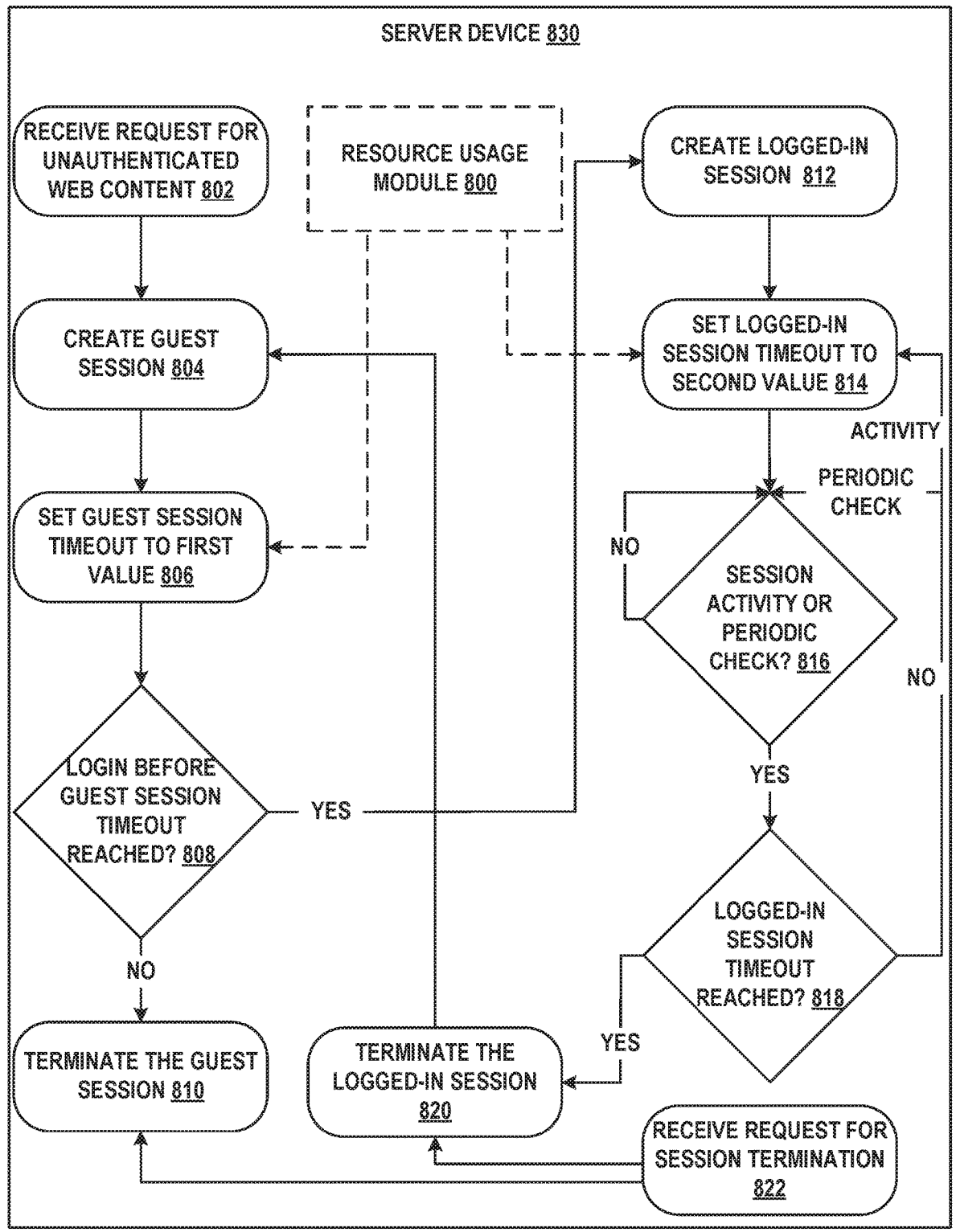
FIG. 8 depicts a flow chart related to session timeouts, in accordance with example embodiments.

Specifically, FIG. 8 illustrates server device 830, which may represent resource server 604, authorization server 606, server cluster 200, or computational instance 322, among other possibilities. Based on or in response to a computing device establishing a communicative connection with server device 830, server device 830 may generate and store data representative of a guest session or a logged-in session between the computing device and server device 830. Specifically, at block 802, server device 830 may receive a request for unauthenticated web content. Unauthenticated web content may include any data, services, applications, or other software resources on server device 830 that are publicly accessible without login credentials. In one example, the unauthenticated web content may be a login web page (e.g., login page transmitted at arrow 616 or arrow 708).

Based on or in response to receiving the request at block 802, server device 830 may create a guest session, as indicated by block 804. Creating the guest session may include generating and storing data (e.g., HTTP cookie identifier) that identifies the computing device which transmitted the request at block 802. Based on or in response to creating the guest session at block 804, server device may set a guest session timeout value associated with this guest session to a first value, as indicated by block 806. In some implementations, the first value may be a fixed, predefined value. Alternatively, the first value may be dynamically determined by resource usage module 800 of server device 830.

Namely, as the extent or amount of resources on server device 830 used by various guest sessions increases, resource usage module 800 may be configured to reduce the first value in order to conserve the remaining resources. On the other hand, when the extent or amount of used resources decreases, resource usage module 800 may be configured to increase the first value in order to provide longer session timeouts to the computing devices. For example, when less than 25% of the memory available on server device 830 is used, the first value may be set by resource usage module 800 to 5 minutes. For each additional 5% of memory usage, the first value may be decreased by 20 seconds. Thus, when memory usage rises to 30%, the first value may be set to 4 minutes and 40 seconds, when memory usage rises to 40%, the first value may be set to 4 minutes, and so on. The relationship between resource usage and the first value may be different in alternative implementations.

Based on or in response to setting the guest session timeout at block 806, server device 830 may monitor the session to determine whether there has been a login before the guest session timeout is reached, as indicated by block 808. If the computing device with which a particular guest session is established has not logged in before the guest session timeout is reached, server device 830 may terminate the guest session, as indicated by block 810. This termination of the guest session may release (i.e., free up) any resources allocated to the guest session, allowing additional communicative connections to be established and maintained with server device 830. Notably, the guest session timeout may be reset or updated (e.g., to the first value) each time a client computing device exhibits some form of activity (e.g., requests additional unauthenticated web content, not shown). Thus, the guest sessions may be terminated at block 810 based on or in response to the client computing device remaining idle for longer than the guest session timeout value set at block 806.

On the other hand, if the computing device with which the particular guest session is established logs in before the guest session timeout is reached, server device 830 may create a logged-in session for the computing device, as indicated by block 812. In one example, the logged-in session may be created by modifying the attributes associated with the guest session created at block 804. Namely, the type of session may be changed from guest to logged-in. Additionally, based on or in response to creating the logged-in session, server device 830 may set the logged-in session timeout value of the logged-in session to a second value, as indicated by block 814.

The second value, much like the first value, may be fixed or, in some implementations, be determined by resource usage module 800 based on the extent of resources used up by other sessions. For example, the second value may be increased in inverse proportion to the extent of resource usage on server device 830. Notably, however, logged-in sessions may be provided with a longer timeout value than guest sessions. That is, the second value may be larger than the first value. Thus, in the absence of activity (i.e., active communication between the client device and server 830), authenticated users may be granted access to resources for a longer period of time than unauthenticated users. In other words, authenticated users are allowed to be inactive for a longer period of time than unauthenticated users before their respective sessions are terminated.

In one example, as the first value is increased, the second value may be increased by at least a commensurate amount. Similarly, as the first value is decreased, the second value may be decreased by no more than a commensurate amount. Additionally or alternatively, in some cases, as the first value is increased, the second value may be increased by an amount greater than that by which the first value is increased. Similarly, as the first value is decreased, the second value may be decreased by an amount smaller than that by which the first value is decreased. Thus, as resources of server device 830 become scarce, logged-in sessions may become increasingly preferred and prioritized over guest sessions.

In some cases, the session timeout values may be adjusted proactively for new sessions (e.g., both logged-in and guest sessions). That is, while new sessions may be assigned different first or second values by resource usage module 800, existing sessions may retain the timeout values originally assigned thereto upon their creation. Alternatively or additionally, the session timeout values may be adjusted retroactively. That is, the first and second values assigned to existing sessions may be changed as new values are determined by resource usage module 800 in view of changes in resource usage. In one example, new first and second values may be assigned to existing sessions each time such new values are determined. Alternatively, new first and second values may be assigned to existing sessions each time such sessions exhibit some activity.

Notably, in the case of load-balanced server devices, any modifications to the guest or logged-in sessions may be made uniformly across all the load-balanced server devices. That is, when a session timeout is adjusted for a particular session, each of the load-balanced servers associated with this session may have a corresponding record of the session updated to reflect the adjusted timeout. Similarly, when a session is terminated, the session may be terminated across each of the load-balanced server devices.

In some implementations, one or more of the second value of the guest session timeout or the first value of the logged-in session timeout, respectively, may be based on one or more additional factors or attributes. These factors may include, for example, a priority level associated with the service, application, or other software resource being accessed on server device 830, the IP address associated with the computing device communicating with server 830, and/or the specific user accessing server device 830, among others.

For example, a first service may be prioritized over a second service and, accordingly, the logged-in session timeout for the first service may be longer than that for the first service. This may remain the case as the logged-in session timeout value is scaled according to resource usage by resource usage module 800. In another example, computing devices associated with IP addresses within a particular range or set of IP addresses (e.g., computing devices within managed network 300) may similarly be provided with longer session timeouts than other computing devices. In a further example, some user accounts (e.g., administrative accounts) may be provided with a longer logged-in session timeout than other user accounts (e.g., non-administrative accounts). Server device 830 and/or resource usage module 800 may also consider other factors not mentioned herein in setting the timeout values.

Based on or in response to setting the logged-in session timeout value, server device 830 may await computing device associated with the logged-in session to requests one or more resources from server device 830, as indicated by block 816. Based on or in response to the computing device exhibiting some logged-in session activity (e.g., requesting resources from server device 830), server device 830 may determine whether the logged-in session timeout has been reached, as indicated by block 818. If the logged-in session timeout has not been reached, server device 830 may provide the resources requested by the computing device (not shown).

Additionally, when the computing device exhibits some logged-in session activity (before the logged-in session is terminated), server device 830 may update the logged-in session timeout by repeating the operations of block 814. Thus, the logged-in session may be renewed and the length of time for which this session is valid may be adjusted based on any change in the amount of resource usage (e.g., the second value may have changed since the timeout value was previously set). On the other hand, if the logged-in session timeout has been reached, server device 830 may terminate the logged-in session, as indicated by block 820.

Alternatively or additionally, as indicated by block 816, server device 830 may periodically, at predetermined time intervals, check whether the logged-in session timeout has been reached. Notably, server device 830 may monitor for expiration of the logged-in session timeout independently of any session activity. Thus, in some cases, the logged-in session may be terminated at block 820 even when the computing device does not request any resources. This periodic checking for whether the logged-in session timeout has been reached might not cause the logged-in session timeout to be updated. Instead, after periodically checking for the logged-in session timeout, server device may return to block 816.

In some embodiments, server device 830 may be configured to receive a request for session termination, as indicated by block 822. The request may indicate to terminate guest sessions, logged-in sessions, or both. In one example, the request may be generated manually (e.g., by a user or administrator) by way of a user interface associated with server device 830. In another example, the request may be generated automatically by, for example, resources usage module 800. In either case, the request for session termination may be based on the extent of usage of computing resources (e.g., memory) on server device 830 exceeding a particular threshold, or based on server device 830 exhibiting some abnormal behavior (e.g., reduced operating speed). Accordingly, depending on which types of sessions are requested to be terminated at block 822, server device 830 may be configured to terminate one or more guest sessions, as indicated by block 810, and/or one or more logged-in sessions, as indicated by block 820. Notably, based on or in response to the request at block 822, server device 830 may be configured to terminate these sessions before their respective timeouts have been reached.

VIII. Example Operations

Figure 9:
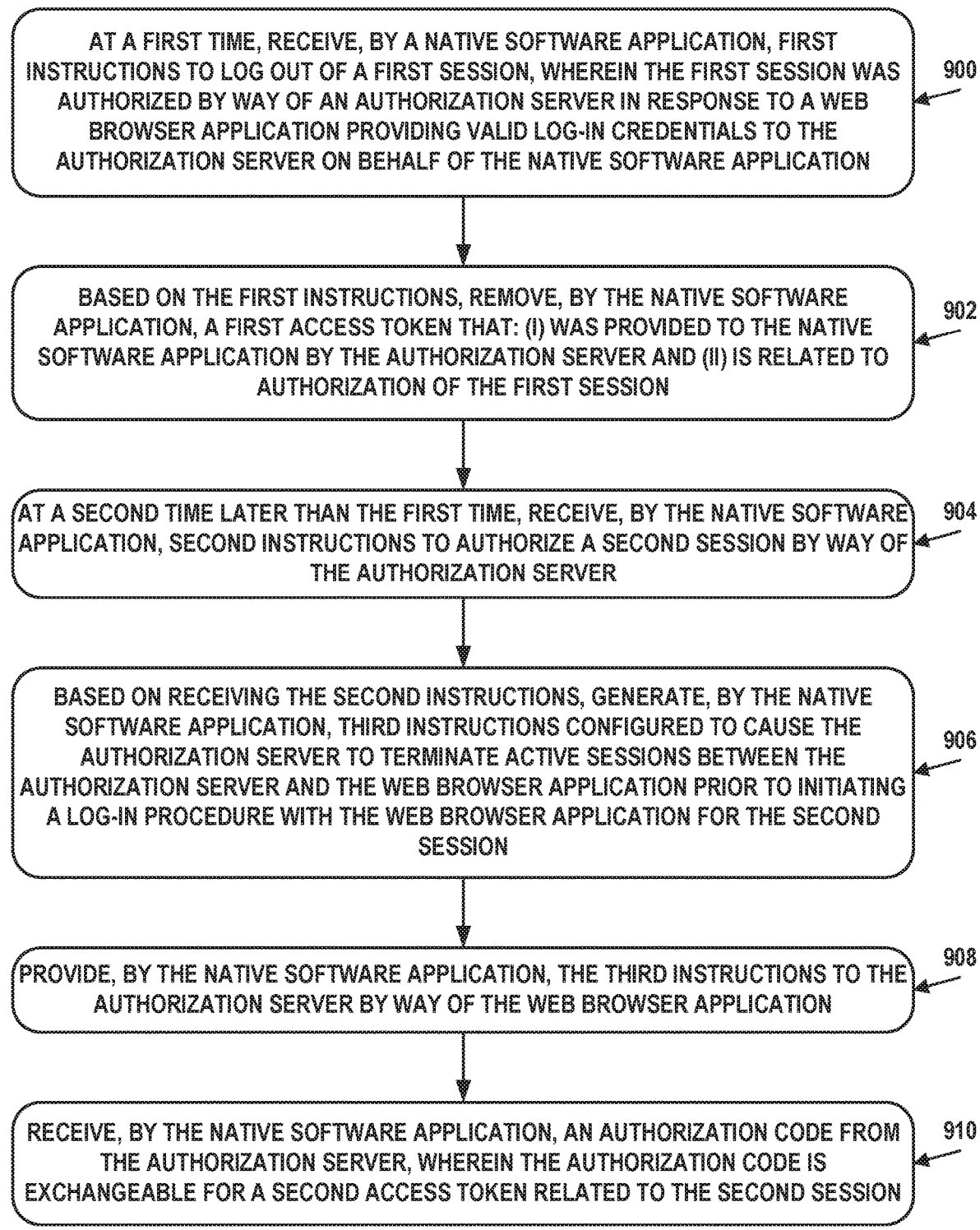
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 involves, at a first time, receiving, by a native software application, first instructions to log out of a first session. The first session may have been authorized by way of an authorization server in response to a web browser application providing valid log-in credentials to the authorization server on behalf of the native software application.

Block 902 involves, based on the first instructions, removing, by the native software application, a first access token that: (i) was provided to the native software application by the authorization server and (ii) is related to authorization of the first session.

Block 904 involves, at a second time later than the first time, receiving, by the native software application, second instructions to authorize a second session by way of the authorization server.

Block 906 involves, based on receiving the second instructions, generating, by the native software application, third instructions configured to cause the authorization server to terminate active sessions between the authorization server and the web browser application prior to initiating a log-in procedure with the web browser application for the second session.

Block 908 involves providing, by the native software application, the third instructions to the authorization server by way of the web browser application.

Block 910 involves receiving, by the native software application, an authorization code from the authorization server. The authorization code may be exchangeable for a second access token related to the second session.

In some embodiments the first session may include a browser-server session established between the web browser application and the authorization server. The first session may also include an application-server session established between the native software application and the authorization server. Removing the first access token may terminate the application-server session. Removing the first access token might not affect (e.g., terminate) the browser-server session.

In some embodiments, the browser-server session may remain active for a predetermined period of time after removal of the first access token. The third instructions may be configured to terminate the browser-server session prior to the predetermined period of time.

In some embodiments, the browser-server session may be represented by an HTTP cookie provided by the authorization server to the web browser application and stored thereby. The application-server session may be represented by the first access token.

In some embodiments, the third instructions may be generated further based on receiving the first instructions before receiving the second instructions. The native software application may be further configured to, at a third time later than the second time and while the native software application has not been logged out of the second session, receive fourth instructions to authorize a third session by way of the authorization server. Based on receiving the fourth instructions, the native software application may generate fifth instructions configured to cause the authorization server to maintain active sessions between the authorization server and the web browser application for the log-in procedure with the web browser application for the third session. The native software application may provide the fifth instructions to the authorization server by way of the web browser application and receive, from the authorization server, another authorization code. The another authorization code may be exchangeable for a third access token related to the third session.

In some embodiments, the third access token may provide the native software application a greater scope of access to resources than the second access token. The resources may be provided by a resource server associated with the authorization server.

In some embodiments, a logged-in session between the web browser application and the authorization server may be configured to persist for a longer period of time than a guest session between the web browser application and the authorization server.

In some embodiments, the authorization server may include or be provided by a computational instance of a remote network management platform.

In some embodiments, the native software application may be further configured to, based on receiving the second instructions, generate a code verifier and a code challenge. The native software application may provide the code challenge to the authorization server by way of the web browser application. The authorization server may be configured to generate the authorization code based on receiving the code challenge. The native software application may be configured to, based on receiving the authorization code, provide the authorization code and the code verifier to the authorization server. The authorization server may be configured to determine that the authorization code has been transmitted by the native software application based on the code verifier and the code challenge. The native software application may be configured to receive, from the authorization server, the second access token.

In some embodiments, the code verifier may include a random string having a predetermined minimum length. The code challenge may include a cryptographic hash value of the code verifier.

In some embodiments, the native software application may be configured to provide the third instructions to the authorization server by embedding the third instructions as a query parameter in a URL used by the web browser application to access the authorization server on behalf of the native software application.

In some embodiments, the third instructions may include a call-back URL identifying the native software application as a recipient of the authorization code from the authorization server.

In some embodiments, the authorization code may be received by the native software application from the authorization server by way of the web browser application.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
a web browser application; and
a native software application configured to:
at a first time, receive first instructions to log out of a first session, wherein the first session was authorized by way of an authorization server in response to the web browser application providing valid log-in credentials to the authorization server on behalf of the native software application;
based on the first instructions, remove a first access token that: (i) was provided to the native software application by the authorization server and (ii) is related to authorization of the first session;
at a second time later than the first time, receive second instructions to authorize a second session by way of the authorization server;
based on receiving the second instructions, generate third instructions configured to cause the authorization server to terminate active sessions between the authorization server and the web browser application prior to initiating a log-in procedure with the web browser application for the second session;
provide the third instructions to the authorization server by way of the web browser application; and
receive, from the authorization server, an authorization code, wherein the authorization code is exchangeable for a second access token related to the second session.

2. The computing system of claim 1, wherein the first session comprises: (i) a browser-server session established between the web browser application and the authorization server, and (ii) an application-server session established between the native software application and the authorization server, wherein removing the first access token terminates the application-server session.

3. The computing system of claim 2, wherein the browser-server session remains active for a predetermined period of time after removal of the first access token, and wherein the third instructions are configured to terminate the browser-server session prior to the predetermined period of time.

4. The computing system of claim 2, wherein the browser-server session is represented by a hypertext transfer protocol (HTTP) cookie provided by the authorization server to the web browser application and stored thereby, and wherein the application-server session is represented by the first access token.

5. The computing system of claim 1, wherein the third instructions are generated further based on receiving the first instructions before receiving the second instructions, and wherein the native software application is further configured to:
at a third time later than the second time and while the native software application has not been logged out of the second session, receive fourth instructions to authorize a third session by way of the authorization server;
based on receiving the fourth instructions, generate fifth instructions configured to cause the authorization server to maintain active sessions between the authorization server and the web browser application for the log-in procedure with the web browser application for the third session;

provide the fifth instructions to the authorization server by way of the web browser application; and receive, from the authorization server, another authorization code, wherein the another authorization code is exchangeable for a third access token related to the third session.

6. The computing system of claim 5, wherein the third access token provides the native software application a greater scope of access to resources than the second access token, and wherein the resources are provided by a resource server associated with the authorization server.

7. The computing system of claim 1, wherein a logged-in session between the web browser application and the authorization server is configured to persist for a longer period of time than a guest session between the web browser application and the authorization server.

8. The computing system of claim 1, wherein the authorization server comprises a computational instance of a remote network management platform.

9. The computing system of claim 1, wherein the native software application is further configured to:

based on receiving the second instructions, generate a code verifier and a code challenge;

provide the code challenge to the authorization server by way of the web browser application, wherein the authorization server is configured to generate the authorization code based on receiving the code challenge;

based on receiving the authorization code, provide the authorization code and the code verifier to the authorization server, wherein the authorization server is configured to determine that the authorization code has been transmitted by the native software application based on the code verifier and the code challenge; and receive, from the authorization server, the second access token.

10. The computing system of claim 9, wherein the code verifier comprises a random string having a predetermined minimum length, and wherein the code challenge comprises a cryptographic hash value of the code verifier.

11. The computing system of claim 1, wherein the native software application is configured to provide the third instructions to the authorization server by:

embedding the third instructions as a query parameter in a uniform resource locator (URL) used by the web browser application to access the authorization server on behalf of the native software application.

12. The computing system of claim 1, wherein the third instructions comprise a call-back uniform resource locator (URL) identifying the native software application as a recipient of the authorization code from the authorization server.

13. The computing system of claim 1, wherein the authorization code is received by the native software application from the authorization server by way of the web browser application.

14. A method comprising:

at a first time, receiving, by a native software application, first instructions to log out of a first session, wherein the first session was authorized by way of an authorization server in response to a web browser application providing valid log-in credentials to the authorization server on behalf of the native software application;

based on the first instructions, removing, by the native software application, a first access token that: (i) was provided to the native software application by the authorization server and (ii) is related to authorization of the first session;

at a second time later than the first time, receiving, by the native software application, second instructions to authorize a second session by way of the authorization server;

based on receiving the second instructions, generating, by the native software application, third instructions configured to cause the authorization server to terminate active sessions between the authorization server and the web browser application prior to initiating a log-in procedure with the web browser application for the second session;

providing, by the native software application, the third instructions to the authorization server by way of the web browser application; and receiving, by the native software application, an authorization code from the authorization server, wherein the authorization code is exchangeable for a second access token related to the second session.

15. The method of claim 14, wherein the first session comprises: (i) a browser-server session established between the web browser application and the authorization server, and (ii) an application-server session established between the native software application and the authorization server, wherein removing the first access token terminates the application-server session.

16. The method of claim 15, wherein the browser-server session remains active for a predetermined period of time after removal of the first access token, and wherein the third instructions are configured to terminate the browser-server session prior to the predetermined period of time.

17. The method of claim 15, wherein the browser-server session is represented by a hypertext transfer protocol (HTTP) cookie provided by the authorization server to the web browser application and stored thereon, and wherein the application-server session is represented by the first access token.

18. The method of claim 14, wherein the third instructions are generated further based on receiving the first instructions before receiving the second instructions, and wherein the method further comprises:

at a third time later than the second time and while the native software application has not been logged out of the second session, receive fourth instructions to authorize a third session by way of the authorization server;

based on receiving the fourth instructions, generate fifth instructions configured to cause the authorization server to maintain active sessions between the authorization server and the web browser application for the log-in procedure with the web browser application for the third session;

provide the fifth instructions to the authorization server by way of the web browser application; and receive, from the authorization server, another authorization code, wherein the another authorization code is exchangeable for a third access token related to the third session.

19. An article of manufacture including a non-transitory computer-readable medium, having stored thereon program instructions that, upon execution by a computing system, cause the computing system to perform operations comprising:

at a first time, receiving first instructions to log out of a first session, wherein the first session was authorized by way of an authorization server in response to a web browser application providing valid log-in credentials to the authorization server on behalf of a native software application;

based on the first instructions, removing a first access token that: (i) was provided to the native software application by the authorization server and (ii) is related to authorization of the first session;

at a second time later than the first time, receiving second instructions to authorize a second session by way of the authorization server;

based on receiving the second instructions, generating third instructions configured to cause the authorization server to terminate active sessions between the authorization server and the web browser application prior to initiating a log-in procedure with the web browser application for the second session;

providing the third instructions to the authorization server by way of the web browser application; and receiving, from the authorization server, an authorization code, wherein the authorization code is exchangeable for a second access token related to the second session.

20. The article of manufacture of claim 19, wherein the first session comprises: (i) a browser-server session established between the web browser application and the authorization server, and (ii) an application-server session established between the native software application and the authorization server, wherein removing the first access token terminates the application-server session.

* * * * *